(12) United States Patent
Robison

(10) Patent No.: US 9,507,594 B2
(45) Date of Patent: Nov. 29, 2016

(54) METHOD AND SYSTEM OF COMPILING PROGRAM CODE INTO PREDICATED INSTRUCTIONS FOR EXECUTION ON A PROCESSOR WITHOUT A PROGRAM COUNTER

(71) Applicant: Arch D. Robison, Champaign, IL (US)

(72) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 13/987,131

(22) Filed: Jul. 2, 2013

(65) Prior Publication Data

US 2015/0012729 A1    Jan. 8, 2015

(51) Int. Cl.
*G06F 9/45*    (2006.01)
*G06F 9/30*    (2006.01)

(52) U.S. Cl.
CPC .................................. G06F 9/30036 (2013.01)

(58) Field of Classification Search
CPC ....................................................... G06F 9/45
USPC .................................. 717/140, 141, 144, 146
See application file for complete search history.

(56) References Cited

U.S. PATENT DOCUMENTS

| | | | | |
|---|---|---|---|---|
| 5,696,962 A * | 12/1997 | Kupiec | ............. | G06F 17/30672 |
| 5,699,460 A * | 12/1997 | Kopet | .................... | H04N 19/42 |
| | | | | 375/E7.093 |
| 5,920,716 A * | 7/1999 | Johnson | .................. | G06F 8/425 |
| | | | | 717/141 |
| 6,088,691 A * | 7/2000 | Bhargava et al. | ............ | 707/714 |
| 6,115,808 A * | 9/2000 | Arora | ............................ | 712/219 |
| 6,505,345 B1 * | 1/2003 | Chen et al. | .................... | 717/154 |
| 6,637,026 B1 * | 10/2003 | Chen | ....................... | G06F 8/443 |
| | | | | 712/226 |
| 7,584,455 B2 * | 9/2009 | Ball | ............................... | 717/124 |
| 7,689,528 B2 * | 3/2010 | Zheng | ..................... | G06Q 10/04 |
| | | | | 705/7.29 |
| 2002/0051433 A1 * | 5/2002 | Affes | ................. | H04B 1/71052 |
| | | | | 370/335 |
| 2004/0216095 A1 * | 10/2004 | Wu | ............................... | 717/151 |
| 2005/0125785 A1 * | 6/2005 | Gillies et al. | ................. | 717/159 |
| 2006/0253739 A1 * | 11/2006 | Godefroid | ........... | G06F 11/3688 |
| | | | | 714/38.13 |
| 2007/0044084 A1 * | 2/2007 | Wang et al. | ................... | 717/151 |
| 2008/0184211 A1 * | 7/2008 | Nickolls et al. | ............... | 717/140 |
| 2009/0228871 A1 * | 9/2009 | Edwards et al. | .............. | 717/128 |
| 2009/0281999 A1 * | 11/2009 | Sinha | ................. | 707/3 |
| 2011/0060889 A1 * | 3/2011 | Burger et al. | .................. | 712/30 |
| 2011/0072249 A1 * | 3/2011 | Nickolls et al. | .............. | 712/234 |
| 2013/0086370 A1 * | 4/2013 | Burger | ................ | G06F 9/45516 |
| | | | | 712/239 |
| 2013/0173665 A1 * | 7/2013 | Colena | .............. | G06F 17/30312 |
| | | | | 707/797 |
| 2014/0201506 A1 * | 7/2014 | Parashar et al. | .............. | 712/229 |

OTHER PUBLICATIONS

Angshuman Parashar et al., "Triggered Instructions: A Control Paradigm for Spatially-Programmed Architectures", 2013, ACM, (Whole Document).*

* cited by examiner

*Primary Examiner* — Chat Do
*Assistant Examiner* — Jae Jeon
(74) *Attorney, Agent, or Firm* — L. Cho

(57) ABSTRACT

A predicated instruction compilation system includes a control flow graph generation module to generate a control flow graph of a program code to be compiled into the predicated instructions to be executed on a processor that does not include any program counter. Each of the instructions includes a predicate guard and a predicate update. The compilation system also includes a control flow transformation module to automatically generate the predicate guard and an update to the predicate state on the processor. A computer-implemented method of compiling a program code into predicated instructions is also described.

25 Claims, 16 Drawing Sheets

|       | HEAD |                      |           |           |           |
|-------|------|----------------------|-----------|-----------|-----------|
|       |      | 0                    | 1         | 2         | 3         |
| TAIL  | 0    | Zero                 | PlusOne WithinTwo | PlusOne | WithinTwo |
|       | 1    | MinusOne WithinTwo   | Zero      | WithinTwo | NotZero   |
|       | 2    | MinusOne             | WithinTwo | Zero      | WithinTwo |
|       | 3    | WithinTwo            | NotZero   | WithinTwo | Zero      |

FIG. 7

|      | head |          |          |          |          |
|------|------|----------|----------|----------|----------|
|      |      | 0        | 1        | 2        | 3        |
| tail | 0    | Zero     | PlusOne  | PlusOne  | WithinTwo |
|      | 1    | MinusOne | Zero     | WithinTwo | NotZero  |
|      | 2    | MinusOne | WithinTwo | Zero     | WithinTwo |
|      | 3    | WithinTwo | NotZero | WithinTwo | Zero     |

FIG. 8

| NAME | MEANING |
|---|---|
| Top(u,v) | (no constraint) |
| NotZero(u,v) | d(u,v)≠0 |
| WithinTwo(u,v) | d(u,v)∈{1,2} |
| WithinOne(u,v) | d(u,v)=1 |
| PlusOne(u,v) | v = u with a bit set |
| MinusOne(u,v) | v = u with a bit cleared |
| Zero(u,v) | d(u,v)=0 |
| Bottom(u,v) | (no solution) |

METHOD AND SYSTEM OF COMPILING PROGRAM CODE INTO PREDICATED INSTRUCTIONS FOR EXECUTION ON A PROCESSOR WITHOUT A PROGRAM COUNTER

TECHNICAL FIELD

Embodiments of the present disclosure relate to software code compilation. More specifically, embodiments of the present disclosure relate to compiling program code into predicated instructions for execution on a processor without a program counter.

BACKGROUND

A processor in a computer must select what instruction to execute next. A common approach is to employ a program counter to sequence instructions and branch instructions that (often conditionally) modify the program counter. An approach to avoiding branch instructions is to have predicated instructions. When a predicated instruction is selected for execution, a boolean-valued condition (typically referred to as "predicate guard") specified by the instruction is evaluated, and if that condition is false, the instruction's effects are nullified. Predicated instructions are still nominally sequenced, albeit possibly executed out of order subject to dependences. Sequencing determines nominally when to execute an instruction; the predicate determines whether the instruction's effects actually happen.

BRIEF DESCRIPTION OF THE DRAWINGS

The features and advantages of the disclosure are illustrated by way of example and are by no means intended to limit the scope of the disclosure to the particular embodiments shown.

FIG. 7 shows the constraint matrix generated from the control flow graph of FIG. 6 before applying a mathematical lattice according to an exemplary embodiment of the present disclosure.

FIG. 8 shows the constraint matrix generated from the control flow graph of FIG. 6 after applying a mathematical lattice according to an exemplary embodiment of the present disclosure.

FIG. 9 illustrates a list of constraints that a TIA-based compiler can extract from a control flow graph and their meanings according to an exemplary embodiment of the present disclosure.

DESCRIPTION OF THE EMBODIMENTS

Figure 1:
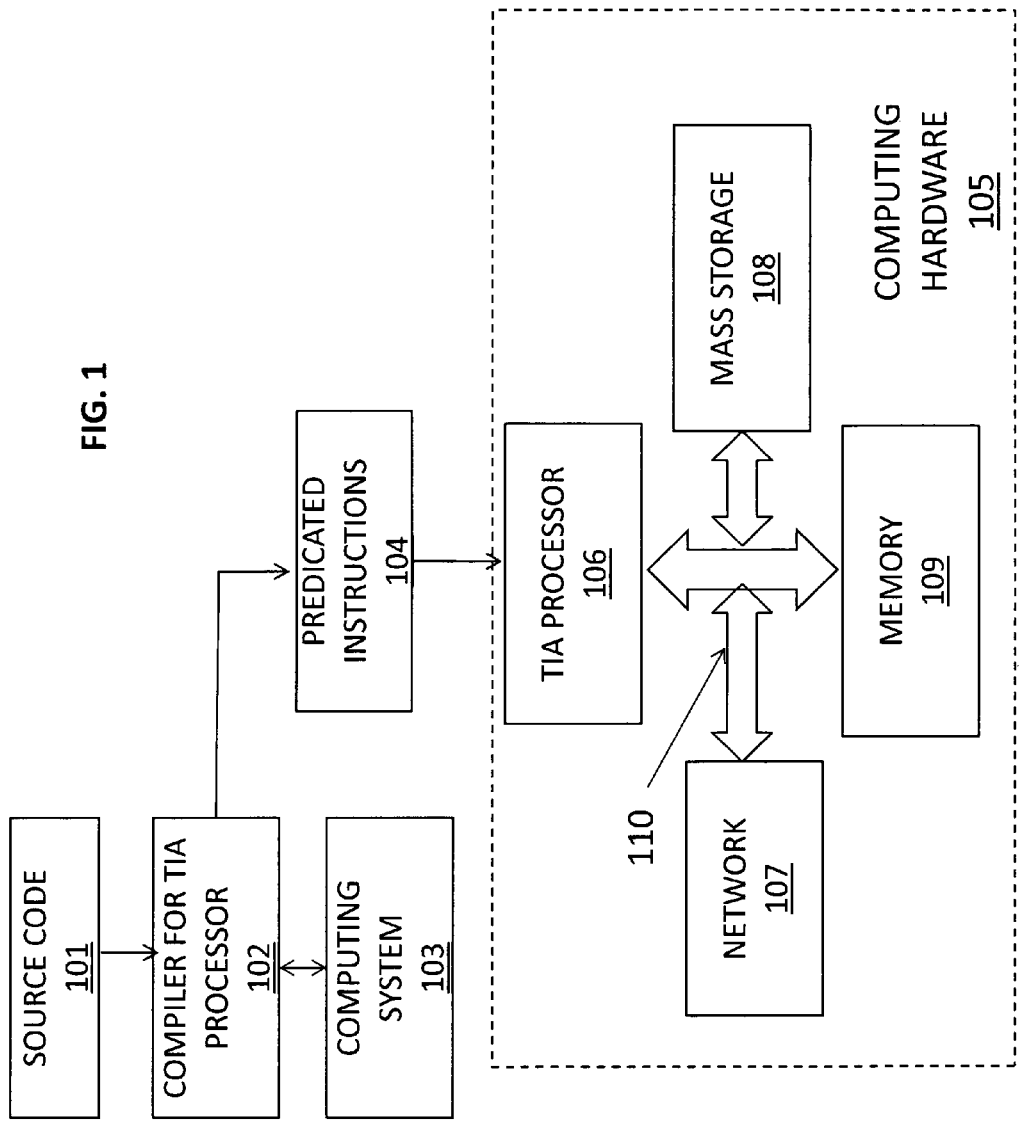
FIG. 1 is an overview of compiling source code into predicated instructions for execution by a Triggered Instruction Architecture-based (TIA-based) processor according to an exemplary embodiment of the present disclosure.

In the following description, for purposes of explanation, specific nomenclature is set forth to provide a thorough understanding of embodiments of the present disclosure. It will be apparent to one skilled in the art that specific details in the description may not be required to practice the embodiments. In other instances, well-known circuits, devices, and programs are shown in block diagram form to avoid obscuring embodiments of the present disclosure unnecessarily.

Branch predication in computer architecture design mitigates the cost associated with conditional branches. Branch prediction is accomplished by allowing each instruction to conditionally either perform an operation or do nothing. This can be done by having each instruction guarded by a predicate (e.g., a boolean-valued source operand) that determines whether the instruction is executed (or nullified) based on a number of conditions specified in the predicate being true. This expression or operation is referred to as predicate guard. The predicate has a value that specifies the required conditions. A predicated instruction will be executed only if its predicate is true. However, predicated instructions are still nominally sequenced, albeit possibly executed out of order subject to dependences. Sequencing determines nominally when to execute an instruction; the predicate determines whether the instruction's effects actually happen.

A Triggered-Instruction Architecture (TIA) eliminates the program counter and branch instructions. Instead of nominally sequencing instructions, a TIA processor treats the set of instructions in a program as unordered. Each instruction specifies a predicate guard and a predicate update. The update part modifies processor state. A predicate guard can inspect that state. At any moment, a TIA processor executes any instruction in the program with a predicate guard condition that evaluates to true. Thus in a TIA-based processor, the predicate guard and predicate update features take on all responsibility for enforcing any requirements for instruction execution order.

However, problems may occur when employing prior compilers to compile program code with branches into predicated instructions for execution on a TIA-based processor without program counter. One such problem is that the prior compiler assumes that instructions will be sequenced by a program counter and that predicates merely determine if an instruction selected per said sequencing is to be executed or nullified. The prior compiler cannot inject the execution sequencing information into the predicate guards, predicate updates, and initial state of the predicate bits. The programmer of the program code needs to hand-synthesize the necessary instruction predicate guards and predicate updates to enforce proper sequencing of the instructions. One manner for this to be achieved is for the programmer to use predicate register bits to simulate a Gray-code program counter, and use ad-hoc predication techniques for branching. The generation of this hand-synthesized control flow requires significant expertise from the programmer and may be very time consuming, especially in figuring out the program counter values that both sequence the instructions properly and are realizable within the limitations of the predicate updates allowed by the hardware. In other words, manual conversion of such a program into equivalent unordered instructions with predicate guards and predicate updates is tedious and error-prone.

Loops illustrate the fundamental difference between prior compilers and the present invention. Prior compilers, when creating predicated code for a loop, rely on the program counter to provide overall sequencing and repetition of the loop. The predicate guards in such a program merely control which instructions inside the loop execute. If the processor has no program counter, then the repetition itself must be synthesized solely from predicate guards and predicate updates.

Writing predicated instructions for TIA-based processor can be very difficult and time consuming. Programmers are used to writing programs in terms of control flow that sequences instructions and branches between sequences.

Thus, a need exists for an improved compiler to compile program code into predicated instructions for execution on a processor without program counter, wherein the compiler automatically generates predicate guards and predicate updates for those instructions from the control flow graph of the program code, as well as automatically generate the initial state of the predicate bits required when starting the program code. In other words, it is desirable to have a mechanism that automatically converts programs written in terms of control flow into unordered predicated instructions suitable for execution on a TIA-based processor.

Figure 2:
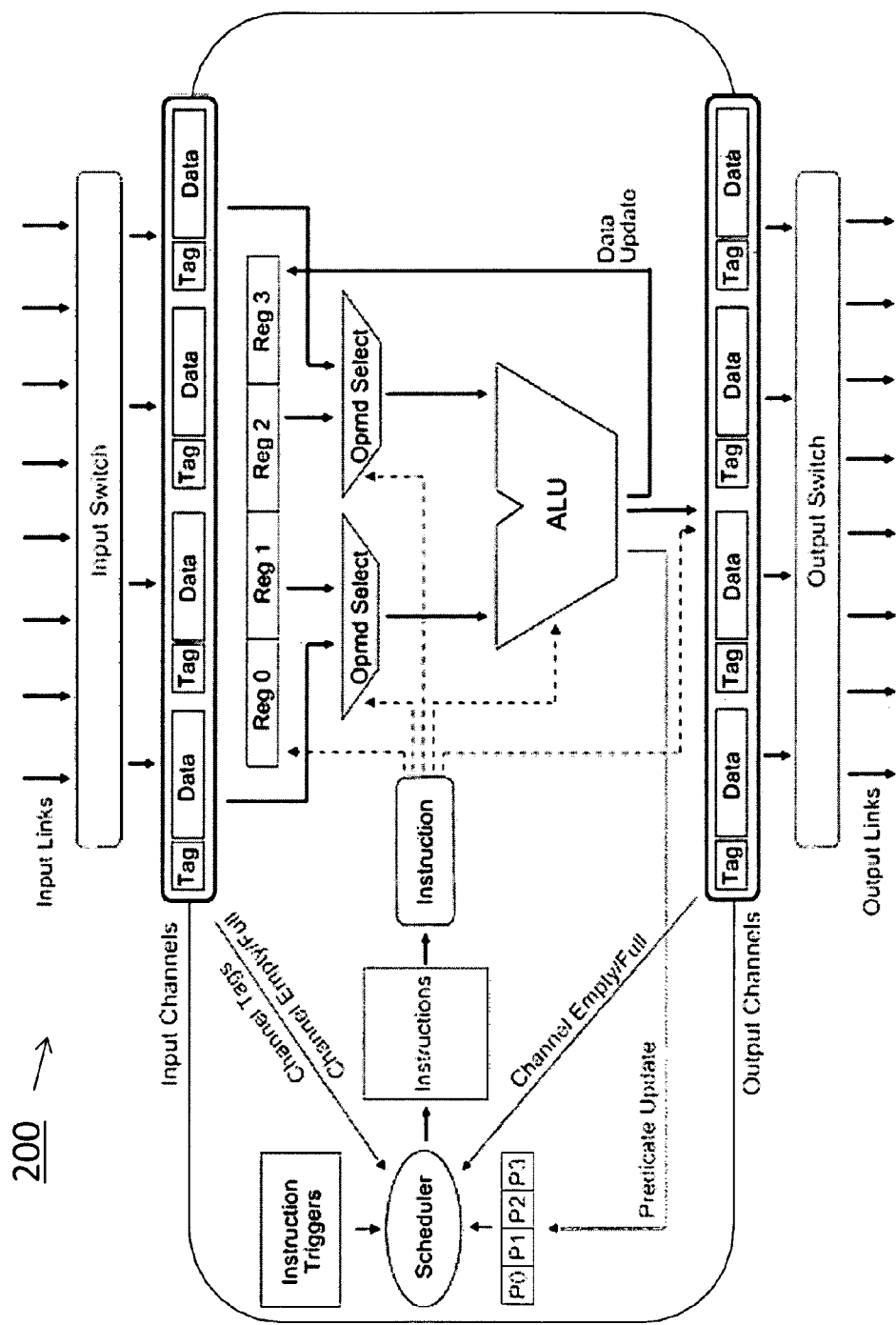
FIG. 2 illustrates in block diagram form the structure of a TIA-based processor according to an exemplary embodiment of the present disclosure.
Figure 3:
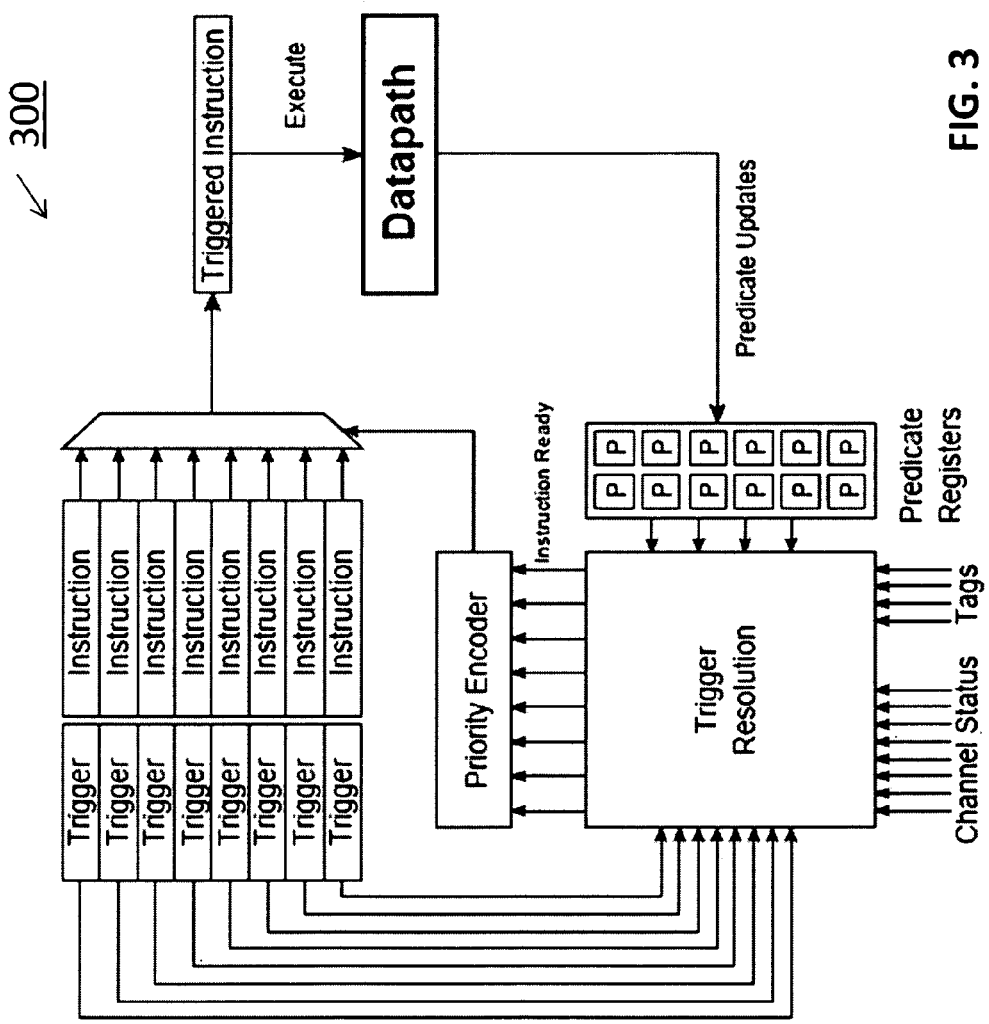
FIG. 3 illustrates the structure of a scheduler of a TIA-based processor according to an exemplary embodiment of the present disclosure.
Figure 4:
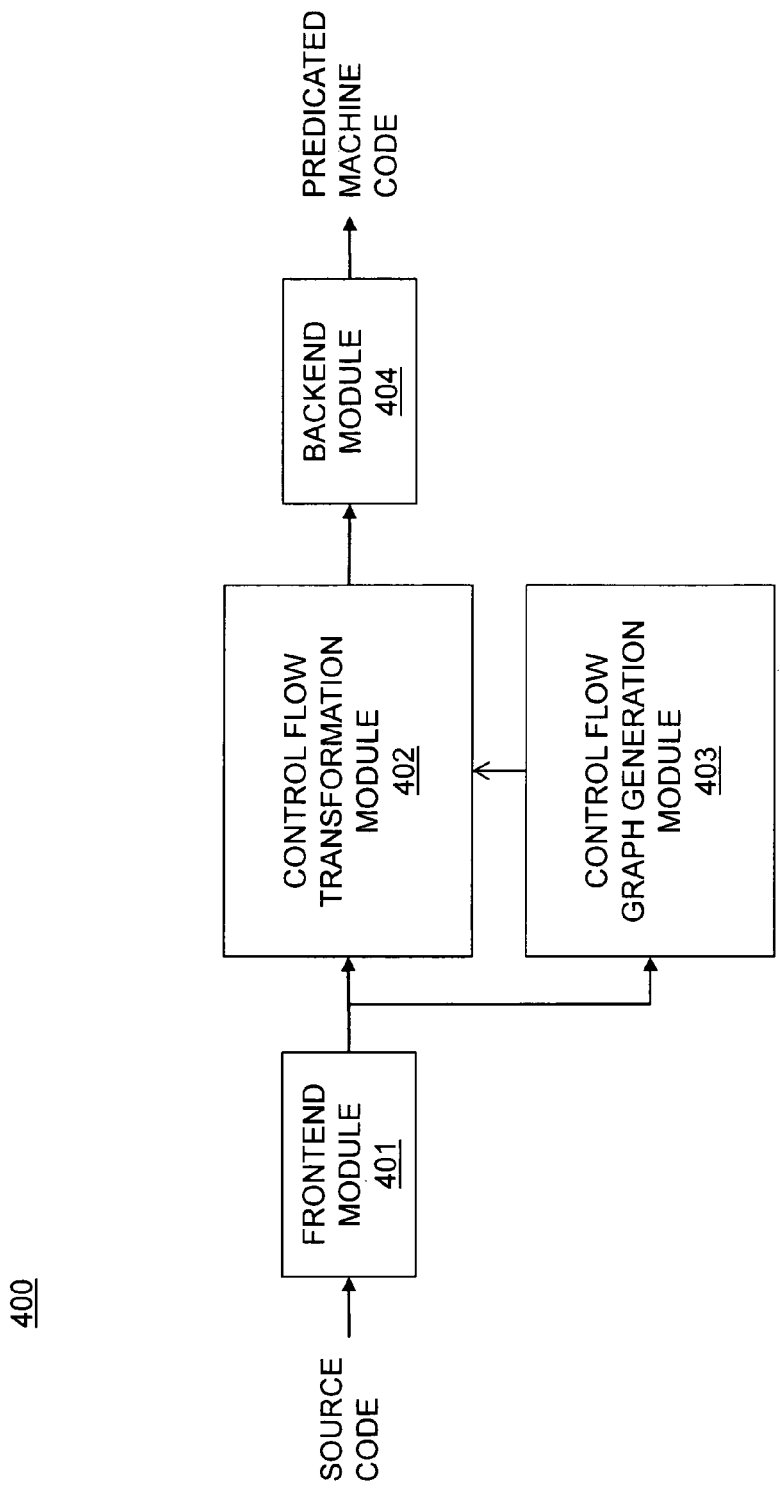
FIG. 4 illustrates in block diagram form the structure of a compiler (i.e., TIA-based compiler) for compiling instructions to be executed on a TIA-based processor according to an exemplary embodiment of the present disclosure.
Figure 5:
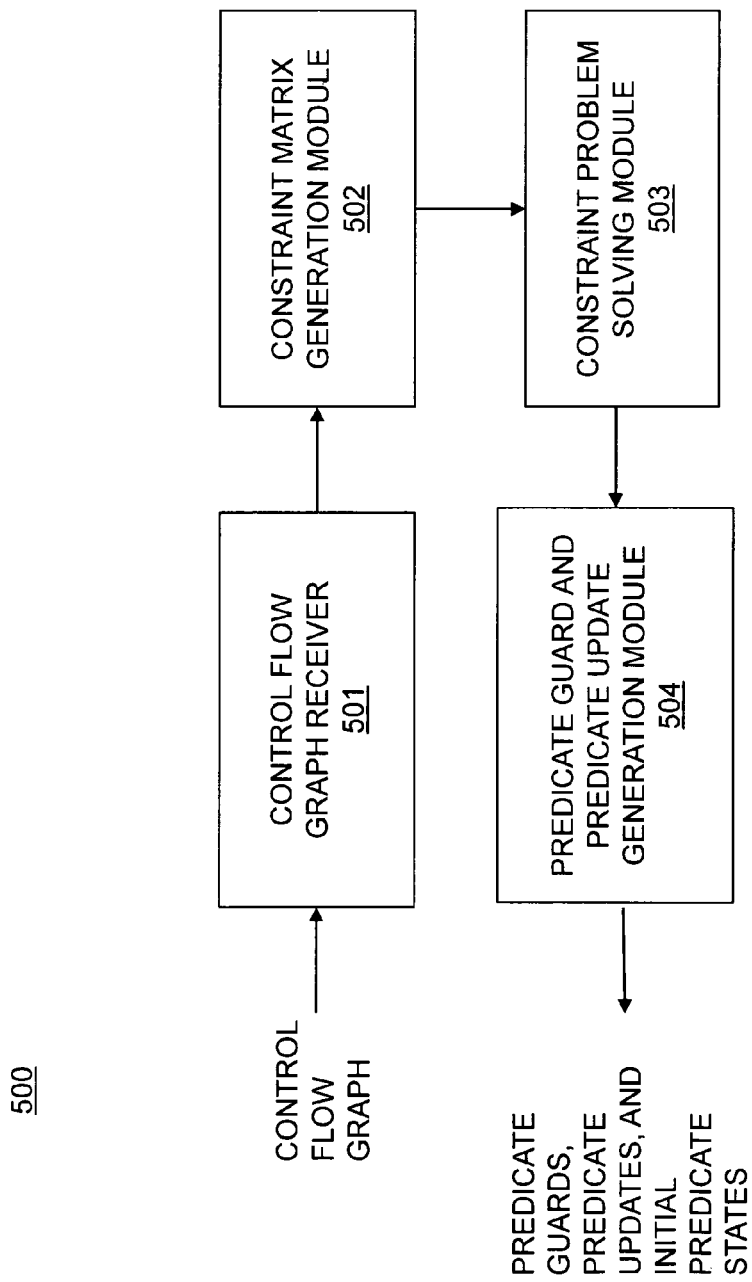
FIG. 5 is the overview of a control flow transformation module of a TIA-based compiler according to an exemplary embodiment of the present disclosure.

FIG. 1 illustrates an overview of employing a compiler 102 to compile source code 101 into predicated instructions 104 for execution by a Triggered Instruction Architecture-based (TIA-based) processor 106 according to an exemplary embodiment of the present disclosure. The TIA-based processor 106 does not include any program counter and does not support branch instructions according to an exemplary embodiment of the present disclosure. According to embodiments of the present disclosure, the compiler 102 automatically generates predicate guards and predicate updates from the control flow graph of the source code 101 for the predicated instructions 104. The compiler 102 also synthesizes the initial state of the predicate bits against which the predicate guards are checking. This automatic generation of predicate guards and predicate updates from the control flow graph of the source code 101 for the predicated instructions 104 will be described in more detail below, also in conjunction with FIGS. 1-16, in which FIGS. 2-3 illustrate the relevant structures of the TIA-based processor 106 and FIGS. 4-5 show in more detail the structure of the compiler 102 for automatically generating predicate guards and updated predicate values for the predicated instructions 104 in accordance with an exemplary embodiment of the present disclosure. FIGS. 6-16 show in more detail the procedures and operation, as well as other associated illustrations, of the compiler 102 in accordance with an exemplary embodiment of the present disclosure.

One advantage of the above described implementation is that by automatically generating the predicate guards and predicate updates from the control flow graph of the program code, the compiled predicated instructions can be executed on a triggered instruction architecture processor that does not have a program counter.

Another advantage of the above described implementation is that by generating or computing the constraint matrix from the control flow graph of the program code, the control flow graph can be converted to distance constraints on bit vectors of predicates, thus allowing automatic generation of predicate guards and updated predicate values for the compiled predicated instructions.

Another advantage of the above described implementation is to allow for program code to be compiled and executed on a TIA-based processor that does not include a program counter and does not support branch operation.

A further advantage of the above described implementation is that during compilation of a program code into predicated instructions, the sequencing information of the code is injected into the predicate guards of the predicated instructions.

Throughout the specification, the following terms are defined as follows.

The term "predicate guard" refers to part of an instruction that specifies a boolean condition to be computed from processor state. When the condition is determined to be true, the operand causes the corresponding instruction to be executed on the processor. While the condition is determined to be false, the operand causes the instruction not to be executed. The condition can specify zero or more internal state bits and their requisite values for the condition to be true. Examples of a state bit are a predicate bit or a bit indicating whether data is available on an input channel. Thus an instruction can be caused to execute whenever (and only whenever) internal state satisfies the condition.

The term "predicate bits" or "predicate register bits" refer to a set of state (or register) bits of a processor. Any single one of those bits is referred to as a "predicate bit". The predicate bits are checked by a predicate guard to determine whether and when the associated instruction is executed and possibly updated by the predicate update of the associated instruction.

The term "initial predicate state" refers to the initial state of the predicate bits when the program starts.

The term "predicate update" refers to part of an instruction that specifies which predicate bits to modify, and what values to assign to those predicate bits. The values may be constants or copies of internal state, such as result flags from an arithmetic unit.

The term "predicate vector" refers to a representation of the state of the predicate bits. A predicate vector representing N predicate bits has N components, each component corresponding to one of the bits in the predicate bits. Each component is sometimes referred to as a "bit". The "predicate bit vector of an instruction" means a predicate vector associated with an instruction.

The term "Triggered Instruction Architecture" or "TIA" refers to a computing architecture or data processing architecture that, instead of using a program counter, depends solely on predicate guards to determine which instructions to execute at any moment. In a non-TIA processor, instruction execution order is implied by a program counter. A non-TIA processor departs from this order only when encountering a branch instruction or by employing a scheduler that executes the instructions out of order as long as their visible effect is the same as in-order execution. In a non-TIA processor, the predicate guard on an instruction serves to indicate whether an instruction is executed or nullified. In a TIA-based processor, however, instructions are unordered. An instruction is executed when its predicate guard has determined that the predicate guard condition for the instruction has been satisfied. There is no fall-through to a next instruction if the predicate guard is false. Indeed there is no notion of a "next" instruction since the instructions are unordered.

The term "constraint" refers to constraint on the predicate vector of one or more instructions. A constraint limits the possible values of the predicate vectors associated with instructions. For example, for a processor that can only update two bits of the predicate bits in a single instruction, if control flow can transition from instruction u to instruction v, then the predicate vectors for u and v must differ in at most two bits (components).

The term "constraint problem" refers to a problem of satisfying all constraints on predicate vectors associated with the instructions of a program, and whose solution is an assignment of values to the predicate vectors such that the constraints are satisfied.

The term "control flow graph" refers to a graph or hyper-graph that shows the control flow of a program code. The control flow graph of a program code represents or expresses the sequencing of the program code. In other words, a control flow graph of a program code is the representation of the sequencing information of the program code.

The term "control flow transformation" refers to a transformation to ordered instructions sequenced explicitly into unordered instructions that are equivalently sequenced by nature of their predicate guards, predicate updates, and the initial predicate state. Though explicit sequencing via a control flow graph is employed in one embodiment, other means such as (but not limited too) program counters and branch instructions, or high-level language constructs, could be used since the essence of the present disclosure operates on control-flow patterns.

The term "computer", "computing system", or "computing hardware" refers to an electronic computing or data processing system that includes a processor, a memory, a mass storage device, and an operating system.

The term "processor" refers to a data processing circuit that can be a microprocessor, a co-processor, a microcontroller, a microcomputer, a central processing unit, a field programmable gate array (FPGA), a processing element of a FPGA, a programmable logic circuit, and/or any circuit that manipulates signals (analog or digital) based on operational instructions that are stored in a memory.

The term "memory" refers to a storage circuit or multiple storage circuits such as read-only memory, random access memory, volatile memory, non-volatile memory, static memory, dynamic memory, flash memory, cache memory, and/or any circuit that stores digital information.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

As can be seen from FIG. 1, the predicated instructions 104 are executed by the TIA-based processor 106 of computing hardware 105. The computer hardware 105 includes a network module 107, a memory 108, and a mass storage 109. These modules and components are interconnected by an internal bus 110.

In one embodiment, the TIA-based processor 106 is a processor. In another embodiment, the TIA-based processor 106 is one of a number of processing elements or units of a FPGA.

The TIA-based processor 106 implements the triggered instruction computing architecture. Under this architecture, the TIA-based processor 106 does not contain any program counter. In addition, the TIA-based processor 106 supports the execution of an unordered collection of instructions. The TIA-based processor 106 also does not support branch instructions. Instead, the TIA-based processor 106 includes a small number of predicate bits for each processor instruction. In one embodiment, the processor 106 includes eight predicate bits and sixteen triggered instructions. In one embodiment, the TIA-based processor 106 limits the number of predicate bits that an instruction can update to no more than two bits. Moreover, the TIA-based processor 106 includes a set of input channels with tag values that can queried.

As described, the triggered-instruction architecture handles execution of predicated instructions by controlling the scheduling of the instructions on the processor's datapath at an instruction-level granularity. Thus, on each machine cycle, the processor 106 chooses to execute an instruction whose predicate guard conditions are true. Guard conditions can check the state of the predicate bits or tag on an input-channel tag. When an instruction executes, it can update some of the predicate bits. Each update of a predicate bit can set it to 0; 1, or the value an ALU (Arithmetic Logic Unit) flag. In one embodiment, the number of predicate bits that one instruction can set or update is limited to two (but any two) predicate bits.

For example, an instruction can be guarded so that it executes when predicate p0 is 1, predicate p1 is 0, and an input channel w has a tag value of 0. As an example of a predicate update, the same instruction might set predicate p1 to the ALU sign flag and set a predicate p2=0. There is no fall-through to a next instruction if the guard is false. Any instruction whose guard evaluates to true can execute next. It is up to the compiler 102 to automatically inject sequencing information into the predicate guards and predicate updates from the control flow graph of the program code for execution on the TIA-based processor 106, which will be described in more detail below according to one embodiment the present disclosure.

FIG. 2 illustrates in block diagram form the structure of a TIA-based processor 200 according to an exemplary embodiment of the present disclosure. The processor 200 of FIG. 2 can implement the TIA-based processor 106 of FIG. 1. FIG. 3 illustrates the structure of a scheduler 300 of a TIA-based processor (e.g., the TIA-based processor 106 of FIG. 1 or the processor 200 of FIG. 2) according to an exemplary embodiment of the present disclosure. They will not be described in more detail below, in order not to unnecessarily obscure the description of the present disclosure.

Referring back to FIG. 1, as described about, the compiler 102 compiles the source code 101 into the predicated instructions 104 that will be executed on the TIA-based processor 106. In one embodiment, the compiler 102 is a software-based code compilation system. In this case, the compiler 102 is run on a computing system 103. The computing system 103 includes a processor, a memory, a mass storage, and an operating system (all are not shown). The processor of the computing system 103 can be a TIA-based processor or a non-TIA-based processor. All the components of the computing system 103 can be implemented using known means and thus will not be described in more detail below.

In another embodiment, the compiler 102 is implemented by firmware.

The source code 101 can be written in any known programming language. In one embodiment, the source code 101 is written using C language. Alternatively, other programming languages can be used to create the source code 101. The compiler 102 is also a language specific compiler for the source code 101.

In the following description, the following program code, written using C language extended with an Occam-like "alt" statement that waits for one of several alternatives to occur, is employed as the source code 101 for illustration purposes to describe the operation of the compiler 102 with respect to injecting sequencing information into the predicate bits of the instructions and automatically generating the predicate guards and predicate updates (or updated predicate bits) for those instructions. The exemplary code below has many "gotos" (i.e., branches) in order to make the control flow explicitly clear. It is not designed to compute anything. It merely serves as a running example for illustration purposes only.

```
L0:
    Alt {
        In.tag==1 => goto L3;
        In.tag==0 && x<0 => goto L1;
        In.tag==0 && x>=0 => goto L0;
    }
L1:
```

-continued

```
Alt{
    y!=0 => goto L0;
    y==0 => goto L2;
}
L2:
    ++y; goto L3;
L3:
    ++x; goto L0;
```

As can be seen from the above exemplary code, the first alt statement offers three alternatives. The first alternative executes if the input channel tag is 1 and transfers control to label L3. The second alternative executes if the input channel tag is 0 and x<0 and transfers control to label L1. The third alternative executes if the input channel tag is 0 and x≥0 and transfers control to label L0. The second alt statement offers two alternatives. The first alternative executes if y≠0 and transfers control to label L0. The second alternative executes if y=0 and transfers control to label L2. This program code has a control flow graph which is shown in FIG. 6.

Figure 6:
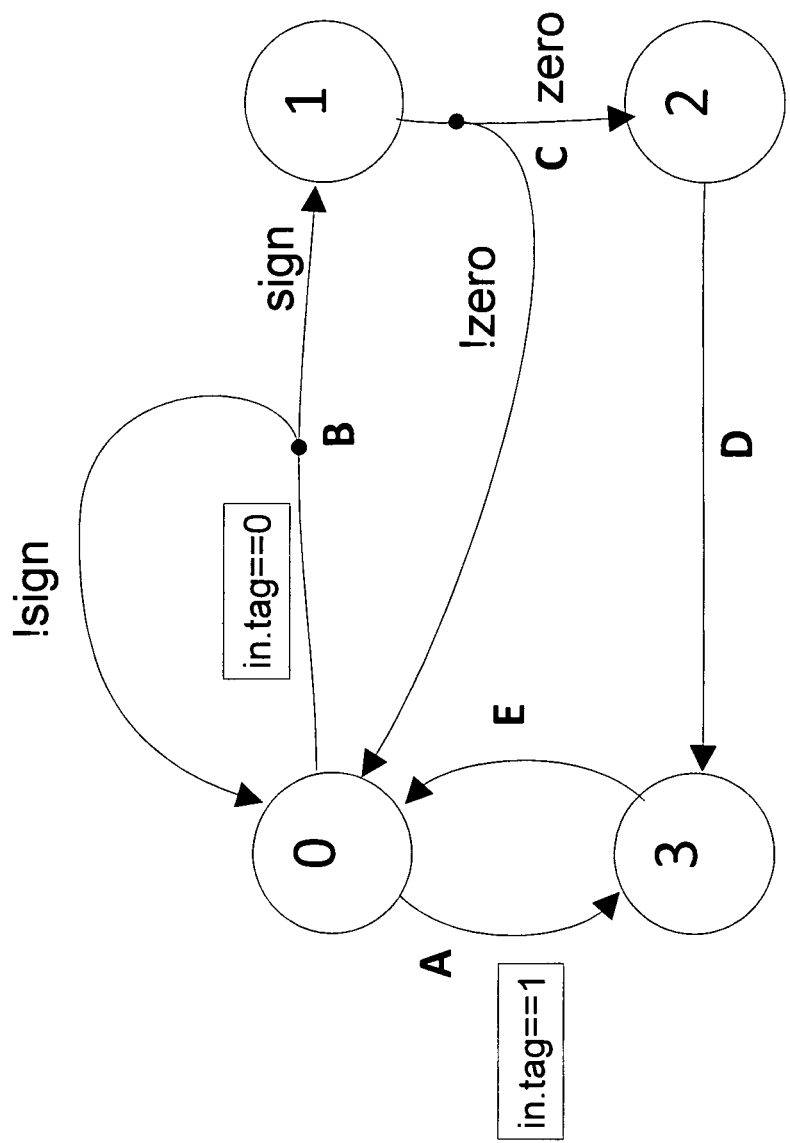
FIG. 6 shows an exemplary control flow graph of a program code.

As can be seen from FIG. 6, the control flow graph is a directed graph or hyper-graph. The graph is formed by a collection of vertices and directed edges, each edge connecting one vertex to another. A hyper-edge has two heads. A hyper-edge from a vertex u to vertices v and w indicates a fork in control flow based on an ALU flag. The edges/hyper-edges labeled with A through E correspond to instructions A through E. Each vertex corresponds to a control flow state. Each edge (or hyper-edge) corresponds to an instruction. A plain edge (e.g., edge A) from a vertex u to a vertex v represents control flow that is unconditional with respect to ALU flags (but possibly conditional on input channel tags). The notations "sign" and "zero" denote ALU flags. For example, instruction C transfers control from state 1 to state 2 if the ALU "zero" flag is set, and to state 0 otherwise. For another example, instruction B transfers control from state 0 to state 1 if the ALU "sign" flag is set, and otherwise leaves control in state 0.

Referring again to FIG. 1, with respect to the above exemplary program code serving as the source code 101, for example, the equivalent compiled predicated instructions 104 (for execution on the TIA-based processor 106) compiled by the compiler 102 are shown below, expressed one per line with C-like syntax. Please note that the equivalent compiled predicated instructions require two predicate bits p0 and p1 and five instructions. The predicate bits p0 and p1 are initially zero.

instruction A: when(in.tag==1 & !p1 & !p0) {p1=1; p0=1;} //L0: . . . goto L3 instruction B: when(in.tag==0 & !p1 & !p0) {p1=(x<0);} //L0: . . . x<0 . . . goto L1 instruction C: when(p1 & !p0) {p1=0; p0=(y==0);} //L1: goto (y==0 ? L2:L0)

instruction D: when(!p1 && p0) {+±y; p1=1;} //L2: ++y; goto L3 instruction E: when(p1 & p0) {++x; p1=0; p0=0;} //L3: ++x; goto L0

For the above predicated instructions, the comments on the right hint at the mapping back to the source code. It is important to note that these TIA-based predicated instructions are unordered. An instruction is executed when its predicate guard ("when") condition is satisfied. There is no fall-through to a next instruction if the predicate guard is false. Indeed, the order in which the instructions are listed is irrelevant to correct functioning of the program.

Each of the instructions shown as a predicate guard and predicate update. The predicate guard is the portion enclosed by "when( . . . )". The predicate update is the assignments to predicate bits. For example, instruction C has a predicate guard of "p1 & !p0" that denotes that the instruction C should execute whenever predicate bit p1 is 1 (true) and p0 is 0 (false). Instruction C has the predicate update of "p1=0; p0=(y==0);", which denotes that whenever it executes, it should assign 0 to predicate bit p1, and assign 1 to predicate bit p0 if y is zero and otherwise assign 0 to predicate bit p0.

As described above, the TIA-based processor 106 limits the number of predicate bits that an instruction can update to a limited number of bits. Our example assumes a limit of 2 bits, though extension to higher limits will be clear. In addition, a programmer may sometimes use an instruction to set a predicate bit explicitly, thus restricting the compiler 102 to using only a portion of the limit. For example, if the programmer uses an instruction to update one predicate bit explicitly and the limit is two bits, the compiler can generate a predicate update that updates only a single predicate bit. Nonetheless, control-flow graphs requiring more than two predicate bits to distinguish states can be accomplished by careful "Gray coding" (i.e., using predicate bits to simulate a Gray code counter). According to embodiments of the present disclosure, the compiler 102 solves this automatically, including the much harder problem of getting the "Gray coding" right when the control flow has branches, which will be described in more detail below, also in conjunction with FIGS. 4-16. The key is that the control flow (or sequencing information) of the predicated instructions to be executed on the TIA-based processor 106 can be expressed as a problem of constraints on predicate vectors.

FIG. 4 illustrates the structure of a compiler 400 that may implement the compiler 102 of FIG. 1 to automatically generate predicate guards and predicate updates from the control flow graph of the source code 101 for the predicated instructions 104 according to an exemplary embodiment of the present disclosure. In one embodiment, the compiler 400 is implemented by software. In this case, all the modules within the compiler 400 are realized or implemented as software modules. In another embodiment, the compiler 400 is implemented by firmware. In this case, all the modules within the compiler 400 are realized or implemented using firmware means.

According to one embodiment of the present disclosure and as will be described in more detail below, the compiler 400 includes a frontend module 401, a control flow transformation module 402, a control flow graph generation module 403, and a backend module 404. The control flow graph generation module 403 is connected to the frontend module 401 and the control flow transformation module 402. The control flow transformation module 402 is connected to the frontend and backend modules 401 and 404.

The frontend module 401 converts or compiles the source code it receives into intermediate code to be applied to the modules 402 and 403. This compilation is done using known means and will not be described in more detail below.

The backend module 404 converts the predicated intermediate code into the final predicated processor instructions (e.g., the predicated instructions 104 of FIG. 1). The backend module 404 performs code optimization, linking, scheduling, and register allocation functions to produce the final predicated instructions. These functions are done using known means and will not be described in more detail below.

The control flow graph generation module 403 receives the compiled intermediate code and extracts the control flow information for the code and generates the control flow graph (e.g., the control flow graph of FIG. 6) of the code. The control flow graph generation module 403 achieves this using known means and will not be described in more detail below.

The control flow transformation module 402 receives the control flow graph of the intermediate code from the control flow graph generation module 403. The control flow transformation module 402 converts the intermediate code it receives from the frontend module 401 into predicated intermediate code. The predication is distinct from well-known "if-conversion" in that the predication embeds all sequencing information extracted from the control-flow graph, not just conditional execution. For example, when the graph has cycles, the predication embeds this cycle information. For another example, when two instructions must unconditionally be executed in some order, the predication preserves this order. Both of these examples are not addressed by classic "if-conversion".

According to one embodiment of the present disclosure, the control flow transformation module 402 also automatically generates predicate guards, predicate updates, and initial predicate state for the predicated intermediate code compiled from the source code (e.g., the source code 101 of FIG. 1). The control flow transformation module 402 automatically generates the predicate guards and predicate updates from the control flow graph of the source code 101 (FIG. 1). The control flow transformation module 402 does this by synthesizing predicate guards and predicate updates that will cause the instructions to be sequenced in the same order as if they were sequenced by the control flow graph.

In doing the above, the control flow transformation module 402 allows the compiled predicated instructions (i.e., the predicate instructions 104 of FIG. 1), to be executed on a TIA-based processor (e.g., the processor 106 of FIG. 1) that does not have a program counter and does not support a branch operation. In addition, by generating distance constraints on predicate vectors from the control flow graph of the program code, the control flow transformation module 402 ensures that the generated predicate updates obey the limits of the processor. In other words, the control flow transformation module 402 injects the sequencing information of the program code into the predicate guards and predicate updates of the predicated instructions. The structure and operation of the control flow transformation module 402 will be described in more detail below, also in conjunction with FIGS. 5-16.

FIG. 5 is the overview of a control flow transformation module 500 of a TIA-based compiler according to an exemplary embodiment of the present disclosure. Control flow transformation module 500 can implement the function of automatic generation of predicate guards and predicate updates of the control flow transformation module 402 of FIG. 4. The control flow transformation module 500 does this by transforming sequencing information expressed in the control flow graph into a constraint problem and solving it. The control flow transformation module 500 then synthesizes the predicate guards and predicate updates.

As can be seen from FIG. 5, the control flow graph transformation module 500 includes a control flow graph receiver 501, a constraint matrix generation module 502, a constraint problem solving module 503, and a predicate guard and predicate update generation module 504. These modules 501 through 504 are connected together. In one embodiment, all of the modules are implemented by software. In another embodiment, the modules 501-504 are implemented by a combination of software, firmware, and hardware.

The control flow graph receiver 501 receives the control flow graph (e.g., the control flow graph of FIG. 6). The control flow graph is a directed graph or hyper-graph as previously described. The graph is formed by a collection of vertices and directed edges, each edge connecting one vertex to another. A hyper-edge has two heads. A hyper-edge from a vertex u to vertices v and w indicates a fork in control flow based on an ALU flag. The edges/hyper-edges labeled with A through E correspond to instructions A through E. Each vertex corresponds to a control flow state. Each edge (or hyper-edge) corresponds to an instruction. A plain edge (e.g., edge A) from a vertex u to a vertex v represents control flow that is unconditional with respect to predicates (but possibly conditional on input channel tags). The notations "sign" and "zero" denote ALU flags. For example, instruction C transfers control from state 1 to state 2 if the ALU "zero" flag is set, and to state 0 otherwise. The control flow graph can be generated using any known means, and will not be described in more detail below.

In one embodiment, a prior instruction can set a predicate bit upon which a subsequent fork (branch) is based. This is useful for cases in which the source code has a conditional branch on a predicate bit instead of an ALU result flag. That extension is important for codes that exploit pipelined branching to improve throughput.

The state of the predicate bits at any given moment can be represented by a predicate vector. For illustration purposes, an n-bit predicate vector is denoted <p(n−1), . . . p2, p1, p0> where each p? symbol denotes one bit. The predicate vector is partitioned into two parts: an implicit part for bits that the control flow transformation module 500 will update, and an explicit part for bits that are updated by the programmer of the program code.

The predicate vector constraints indicate knowledge of predicate bits set by the programmer. For example, if the programmer explicitly set "p0=z<0", dataflow analysis of the program code may indicate where p0 is known to be 0 or 1.

Referring again to FIG. 5, the constraint matrix generation module 502 is employed to perform data flow analysis on the control flow graph of the program code to be compiled and extract all constraints among the instructions of the program code. The constraint matrix generation module 502 also generates a constraint matrix of the constraints extracted (e.g., the constraint matrix shown in FIGS. 7 and 8).

As can be seen from FIGS. 7 and 8, the constraint matrix is square. Each row (and likewise for each column) corresponds to a vertex in the control flow graph. The element at row u and column v indicates a constraint between the implicit parts of the predicate vectors for instruction u and instruction v. For example, if the control flow can transition from u to v, then the predicate vectors for u and v must differ by at most M bits (where M is the maximum number of bits that the TIA-based processor 106 of FIG. 1 can update in a single instruction). In the embodiment to be illustrated, M=2. FIG. 9 illustrates a full list of constraints that the constraint matrix generation module 502 of FIG. 5 can extract from a control flow graph and their meanings according to an exemplary embodiment (M=2) of the present disclosure. For other values of M, the constraint "WithinTwo" changes to "WithinM", and its meaning changes to 1≤d(u,v)≤M.

Figure 10:
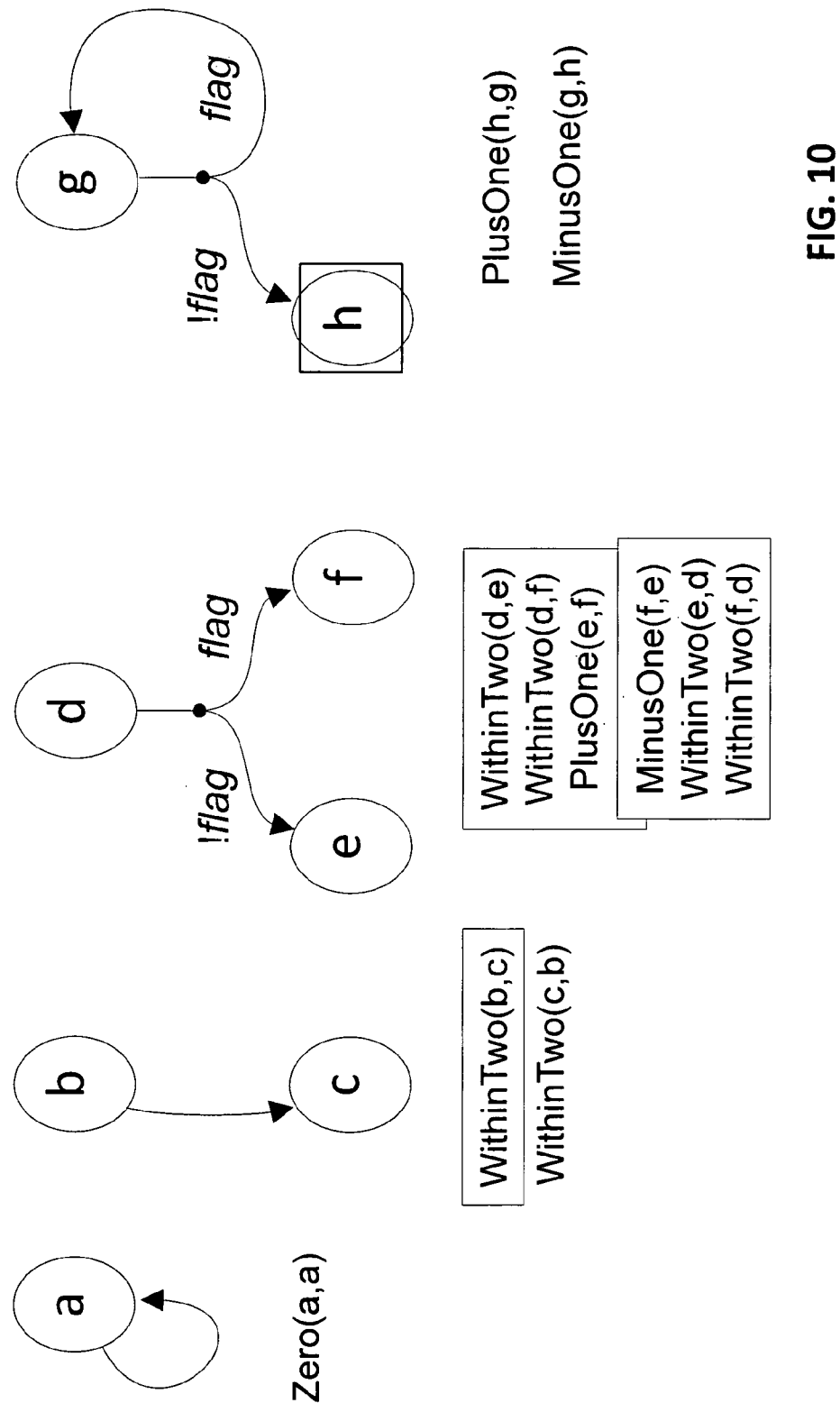
FIG. 10 illustrates how constrains shown in FIG. 9 are expressed or implied in a control flow graph.

The constraint matrix generation module 502 of FIG. 5 extracts the constraints. As described above, a constraint indicates a required relationship between instructions. Constraints are expressed or implied by the control flow of the program code to be compiled. FIG. 10 shows how constraints are expressed or implied by control flow, and thus explains how the constraint matrix generation module 502 extracts the constraints.

As can be seen from FIG. 10, if an edge forms a self loop, as from vertex a to itself, it creates no constraints, because the predicate vector for a control flow vertex cannot differ from itself. An plain edge, as from vertex b to vertex c, implies WithinTwo(b,c) constraint, unless the instruction already sets a predicate bit (i.e., the "explicit" part of the predicate vector is non-empty), in which case the constraint is WithinOne(b,c) on the "implicit" part, assuming a total limit (M=2) of updating at most two predicate bits on the TIA-based processor 106 of FIG. 1.

Referring to FIG. 10, a hyper-edge that goes from a vertex to two other distinct vertices, as from vertex d to vertex e or vertex f, implies WithinTwo(d,e), WithinTwo(e,d), WithinTwo(d,f), WithinTwo(f,d), PlusOne(e,f), MinusOne(f,e). The last two constraints arise because the two vertices e and f can differ by only some predicate bit that is set to an ALU result flag. These last two constraints remain the same even if M≠2.

If a hyper-edge is a partial self loop, as from vertex g to vertices g or h, then the constraints are PlusOne(h,g) and MinusOne(g,h). This requires no special inspection.

Each constraint also implies a constraint with arguments reversed. For example, WithinTwo(b,c) implies WithinTwo(c,b) and PlusOne(e,f) implies MinusOne(f,e).

Figure 11:
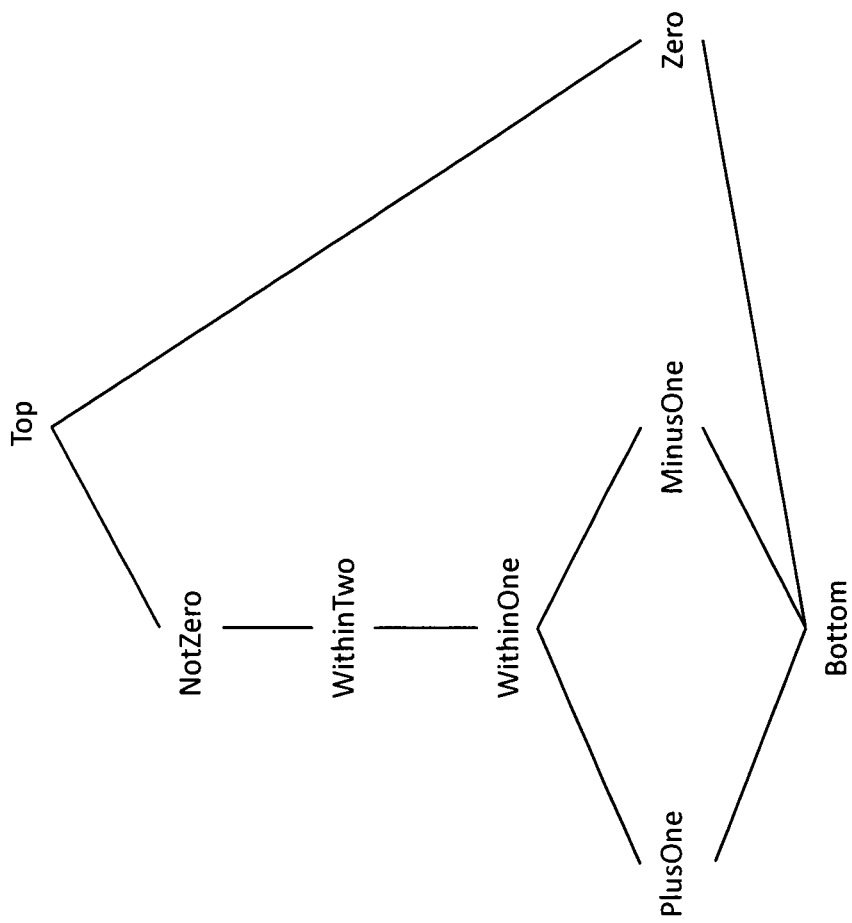
FIG. 11 shows the mathematical lattice of the constraints of FIG. 9, wherein the mathematical lattice shows how multiple constraints can be reduced to a single constraint according to an exemplary embodiment of the present disclosure.

The matrix constraints extracted by the constraint matrix generation module 502 of FIG. 5 form a mathematical lattice. FIG. 11 shows an example Hasse diagram of this lattice. From the lattice, two constraints C(u,v) and D(u,v) can be reduced to a single constraint (C∩D)(u,v), where ∩ is the "greatest lower bound operation" in lattice theory. For example, WithinTwo∩PlusOne reduces to PlusOne. Hence, if multiple constraints need to occupy a matrix element, they can be reduced to a single constraint for that element. The constraint matrix generation module 502 of FIG. 5 can accomplish this using the lattice shown in FIG. 11. FIG. 7 shows the constraint matrix generated from the control flow graph of FIG. 6 before applying the mathematical lattice of FIG. 11. FIG. 8 shows the constraint matrix generated from the control flow graph of FIG. 6 after applying the mathematical lattice of FIG. 11.

Referring again to FIG. 5, the constraint problem solving module 503 is connected to the constraint matrix generation module 502. The constraint problem solving module 503 receives the constraint matrix from the constraint matrix generation module 502. The constraint problem solving module 503 solves constraints between instructions in accordance of an exemplary embodiment of the present disclosure. The constraint problem solving module 503 solves constraints by determining and assigning values to the implicit predicate bits that satisfy the constraints specified in the constraint matrix. In one embodiment, for a TIA-based processor (i.e., the processor 106 of FIG. 1) with eight predicate bits and sixteen instructions, an algorithm can be employed by the constraint problem solving module 503 to determine and assign values to the implicit predicate bits that satisfy the constraints specified in the constraint matrix. The basic procedure is described as follows:

for each vertex v, do:
    ensemble [v]=set of all possible predicate-vectors of length P for each vertex v, do:

inspect column v of constraint matrix:
    K=number of distinct u such that PlusOne (u,v)
    J=number of distinct u such that MinusOne (u,v)
    remove possibilities from ensemble[v] that have fewer than K ones or fewer than J zeros.
loop until report:
    remove illegal possibilities until constraints are satisfied
    if an ensemble becomes empty then
        report "no solution"
    find v with smallest non-singleton ensemble[v]
    if there is no such v then
        report that solution has been found
    remove one possibility from ensemble[v].

Based on the procedure described above, the constraint problem solving module 503 sets each ensemble to all possible P-bit predicate-vectors. To each vertex, the constraint problem solving module 503 maps an ensemble which is a subset of possible predicate-vector values. The value P is the number of implicit predicate bits to be allocated for control flow. For P-bit predicate vectors, there are $2^P$ possible predicate-vectors, so an ensemble can be represented as a $2^P$ bit vector. Setting P to the hardware limit (e.g., eight bits for the TIA-based processor 106 of FIG. 1) eliminates unnecessary predicate bits.

The constraint problem solving module 503 then eliminates possibilities based on the number of incoming (or outgoing) PlusOne or MinusOne constraints. For example, if a column v of the constraint matrix received from the constraint matrix generation module 502 has K PlusOne constrains and J MinusOne constraints, then the bit vector for vertex v must have at least K ones and at least J zeros. All possibilities with fewer ones or zeros can be removed.

The constraint problem solving module 503 then alternates between relaxation and narrowing. The relaxation phase removes possibilities that violate constraints. If any ensemble becomes empty, then it reports that it could not find a solution. The narrowing phase narrows the search space by choosing a non-singleton ensemble from which to remove a possibility. The constraint problem solving module 503 repeats relaxation and narrowing until each vertex has a unique predicate vector.

The constraint problem solving module 503 employs a heuristic that when there is free choice of which possibility to eliminate, remove one from the ensemble with the fewest (but at least two) choices. From that ensemble, remove the "all zeros" possibility if it exists, otherwise remove the one that is largest numeric value when interpreted as a binary numeral. For example, given the possible values for 3-bit predicate vectors, the preference order for removing possibilities is:
000; 111; 110; 101; 100; 011; 010; 001.

The reason for favoring elimination of 000 is that letting it remain unnecessarily tends to trap the constraint problem solving module 503 in a corner, since 000 can only be reached by clearing bits, not by setting bits. A similar argument holds for preferring to eliminate 111. The preference order for the remaining possibilities tends to minimize the number of predicate bits used.

Figure 12:
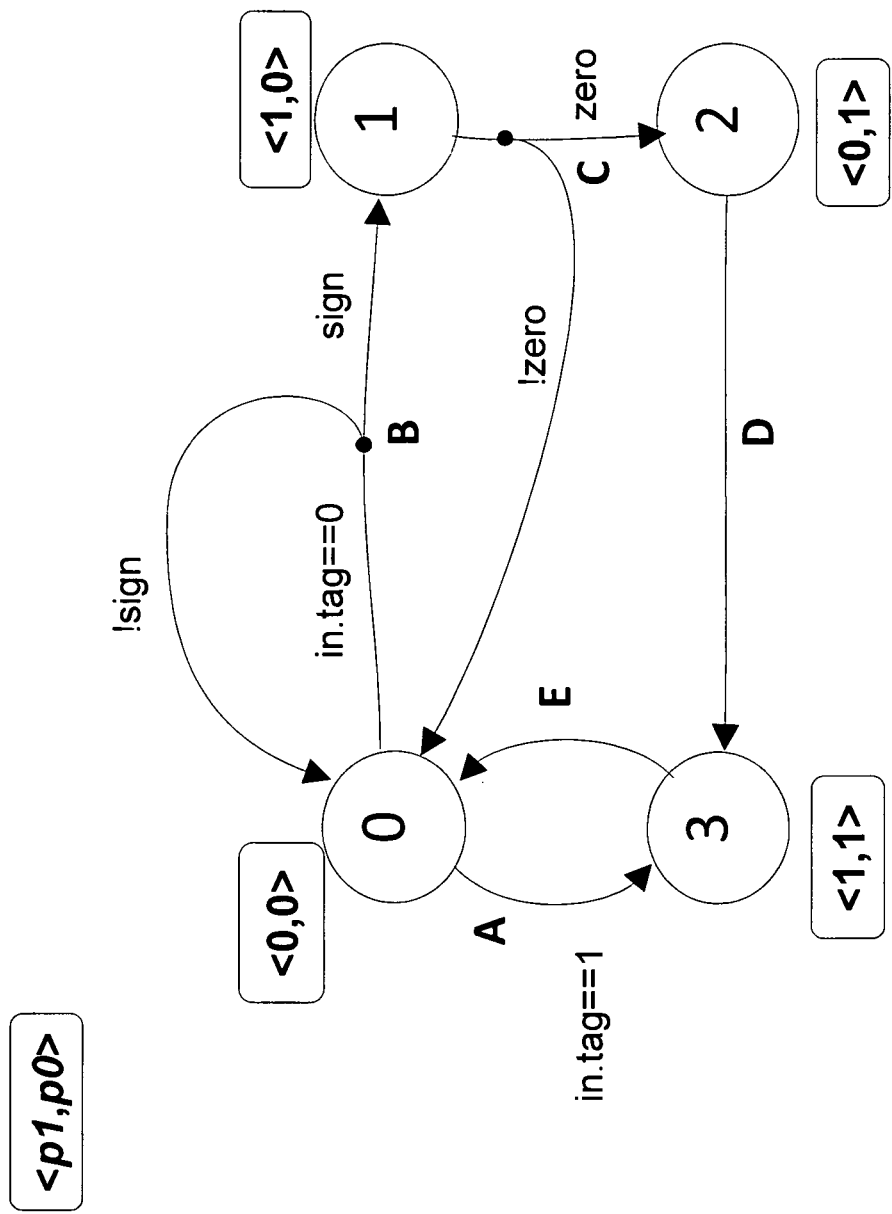
FIG. 12 shows the control flow graph of FIG. 6 with predicate information assigned to each vertex according to an exemplary embodiment of the present disclosure.

The solution provided by the constraint problem solving module 503 is shown in FIG. 12. This solution shown in FIG. 12 is for the running exemplary control flow graph of the exemplary code described above. The solution bit vectors are shown as labels on each vertex.

In other embodiments, other solving algorithms may be used for the constraint problem solving module 503 of FIG. 5.

Referring again to FIG. 5, the predicate guard and predicate update generation module 504 is connected to the constraint problem solving module 503. The predicate guard and predicate update generation module 504 receives the solution from the constraint problem solving module 503 and generates the predicate guards and predicate updates (or updated predicate values). The predicate guard and predicate update generation module 504 achieves this by inspecting the solution. Let S(v) denote the predicate bit-vector for vertex v solution, as received from the constraint problem solving module 503. First, ignore implicit predicate bits which are always 0 or always 1 in S(v) for all vertices v. These bits do not provide any useful state information. Each instruction corresponds to a hyper-edge in the control flow graph. For each instruction, the predicate guard and predicate update generation module 504 finds its corresponding edge or hyper-edge in the control flow graph. Inspecting the solutions for the endpoints of the edge by the predicate guard and predicate update generation module 504 indicates what the guards and predicate updates need to be for that instruction.

The guard should check that the predicate bits match S(v), where v is the tail of the edge for that instruction. For example, if S(v)=<0,1,0> and the bits are named <p2,p1,p0>, then the guard should test that !p2 & p1 & !p0.

Determining the predicate bits to update requires looking at the solutions for the tail and head(s) of the edge. Referring also to FIG. 10, for the self-loop, no update should be done. For the case b to c, the bits to update are the bits that differ in S(b) and S(c). The update should unconditionally update the bits to match their values in S(c).

For the case of a branch from d to e (if !flag) or f (if flag), then bits to update unconditionally are the bits that are the same in S(e) and S(f), but different in S(d). The bit to update with the value of flag is the bit that differs in S(e) and S(f). The matrix constraint from the constraint matrix generation module 503 guarantees that there is only one such bit.

For the case of a branch from g to h, the bit that differs in S(g) and S(h) is the bit to set to ALU flag. That is just a special case of the previous case.

After all instructions are processed, the guard and predicate update generation module 504 has completed the automatic generation of the predicate guards and predicate updates for the predicated instructions (e.g., the instructions 104 of FIG. 1).

Module 504 can generate the initial predicate state, which is the solution S(v0), where v0 is the initial vertex in the control-flow graph where program execution starts.

Applying the above mentioned rules to the example from FIG. 6, the guard and predicate update generation module 504 provides the predicate guards and predicate updates that match the solution generated by the constraint problem solving module 503 for the exemplary control flow graph shown in FIG. 12. For example, for edge A, the bit vector for the tail vertex 0 is <p1,p0>=<0,0>, thus the corresponding guard to add to instruction A is !p1 & !p0, in addition to its prior condition in.tag==1. Edge A transitions both p0 and p1 from 0 to 1, and so instruction A should set both of those bits. For edge C, the bit vector for the tail vertex 1 is <p1,p0>=<1,0>, thus the corresponding guard for instruction C is p1 & !p0. Both bits must change. The bit that must be set according to the ALU flag "zero" is the bit that differs in the bit vectors <0,1> and <0,0> for the two head vertices of edge C. Hence the instruction should be p0="zero flag". It should set p1=0 since p1 is 0 for both heads. The constraints set up by the constraint matrix generation module 502 guarantee that the two heads differ by at most one bit in the right way.

Figure 13:
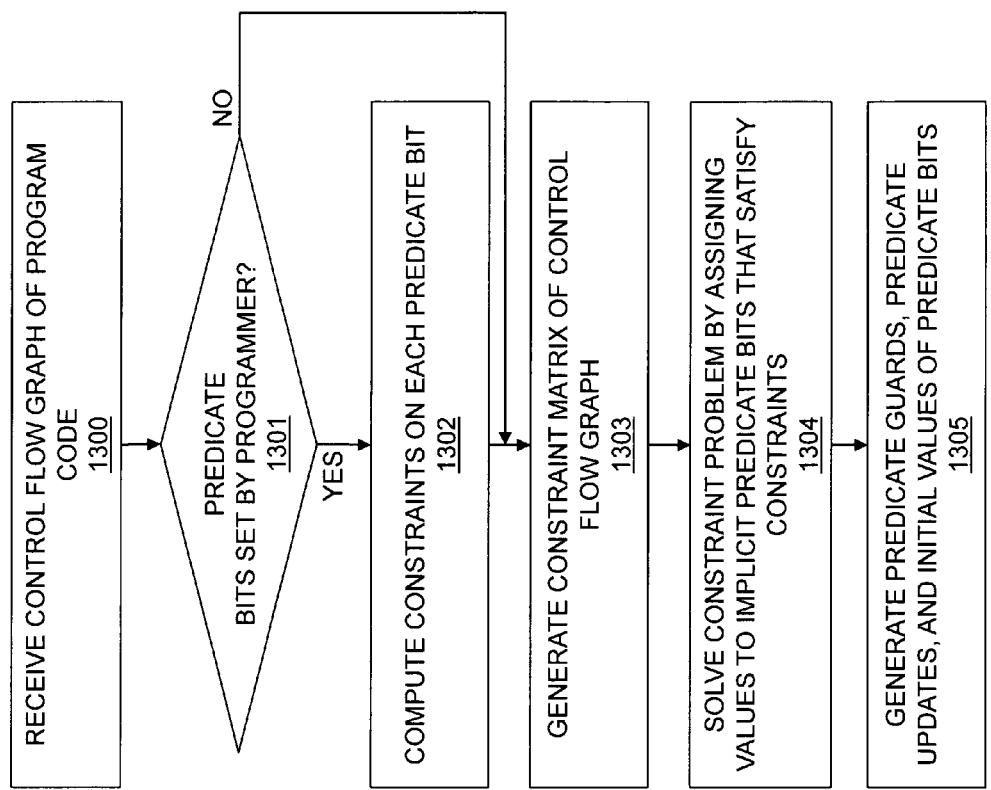
FIG. 13 is a flow chart diagram showing the procedure performed by a TIA-based compiler in automatically generating predicate guards, predicate updates, and initial values of the predicate bits according to an exemplary embodiment of the present disclosure.

FIG. 13 illustrates a procedure of automatically generating predicate guards and predicate updates according to an exemplary embodiment of the present disclosure. The procedure shown in FIG. 6 may be performed by a control flow transformation module (e.g., the control flow transformation module 402 of FIG. 4).

The procedure starts at 1300, at which the control flow transformation module 402 of FIG. 4 receives the control flow graph (e.g., the control flow graph of FIG. 6) of the program code to be compiled.

At 1301, the control flow transformation module 402 of FIG. 4 determines if there is any predicate bit set by the programmer of the program code to be compiled. If so, block 1302 is performed next, at which the control flow transformation module 402 of FIG. 4 computes constraints on each predicate bit.

If it is determined at 1301 that there is no predicate bit set by the programmer, then block 1303 is performed, at which control flow transformation module 402 of FIG. 4 extracts constraints expressed in the control flow graph (e.g., the control flow graph of FIG. 6) as well as set by the programmer. The control flow transformation module 402 of FIG. 4 also generates the constraint matrix for the constraints.

At 1304, the control flow transformation module 402 of FIG. 4 solves the constraint problem by assigning values to the predicate bits that satisfy the constraints.

At 1305, the control flow transformation module 402 of FIG. 4 generates the predicate guards and updated predicate values.

Figure 14:
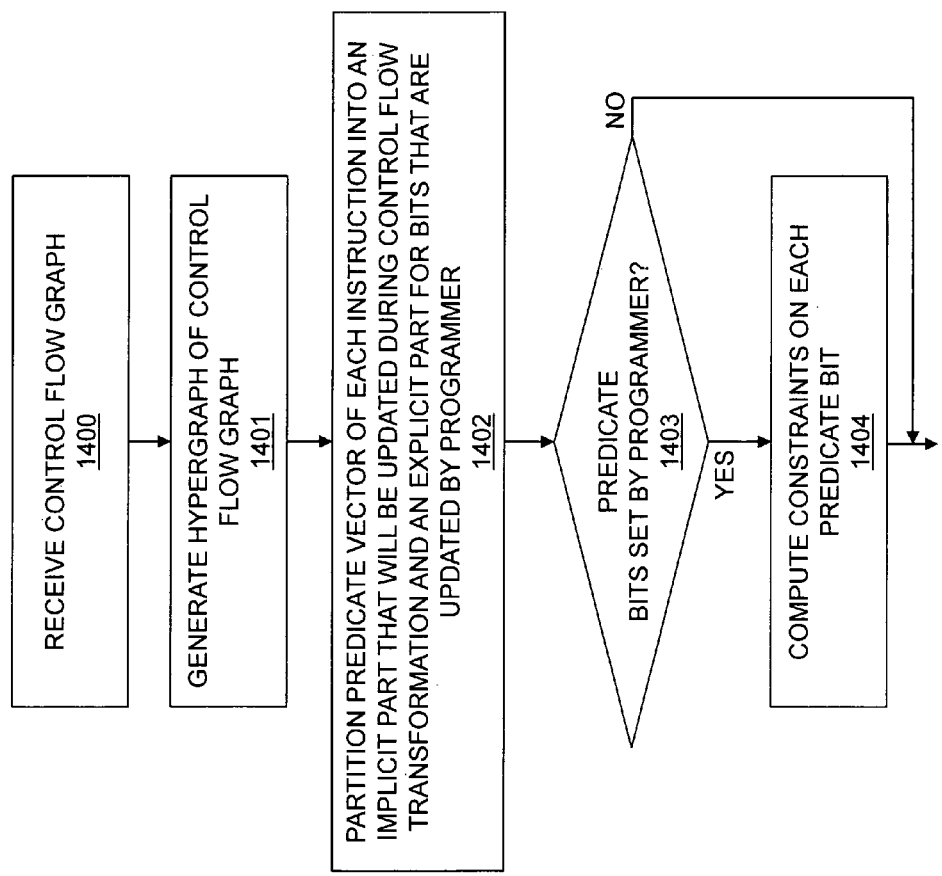
FIG. 14 is a flow chart diagram showing the procedure performed by a control flow graph receiver of a control flow transformation module of a TIA-based compiler according to an exemplary embodiment of the present disclosure.

FIG. 14 is a flow chart diagram showing the procedure performed by a control flow graph receiver (e.g., the control flow graph receiver 501 of FIG. 5) according to an exemplary embodiment of the present disclosure. As can be seen from FIG. 14, the procedure starts at block 1400, at which the control flow graph receiver 501 of FIG. 5 receives the control flow graph.

At 1401 and according to one embodiment, the control flow graph receiver 501 of FIG. 5 generates hyper-graph of the control flow graph. Alternatively, the block 1401 is not performed and can be skipped.

At 1402, the control flow graph receiver 501 of FIG. 5 partitions predicate vector of each instruction into an implicit part that will be updated during control flow transformation and an explicit part for bits that are updated by the programmer.

As 1403, it is determined if the predicate bits are set by the programmer. If so, the block 1404 is performed, at which the control flow graph receiver 501 of FIG. 5 computes constraints on each predicate bit. Otherwise, block 1404 is skipped.

Figure 15:
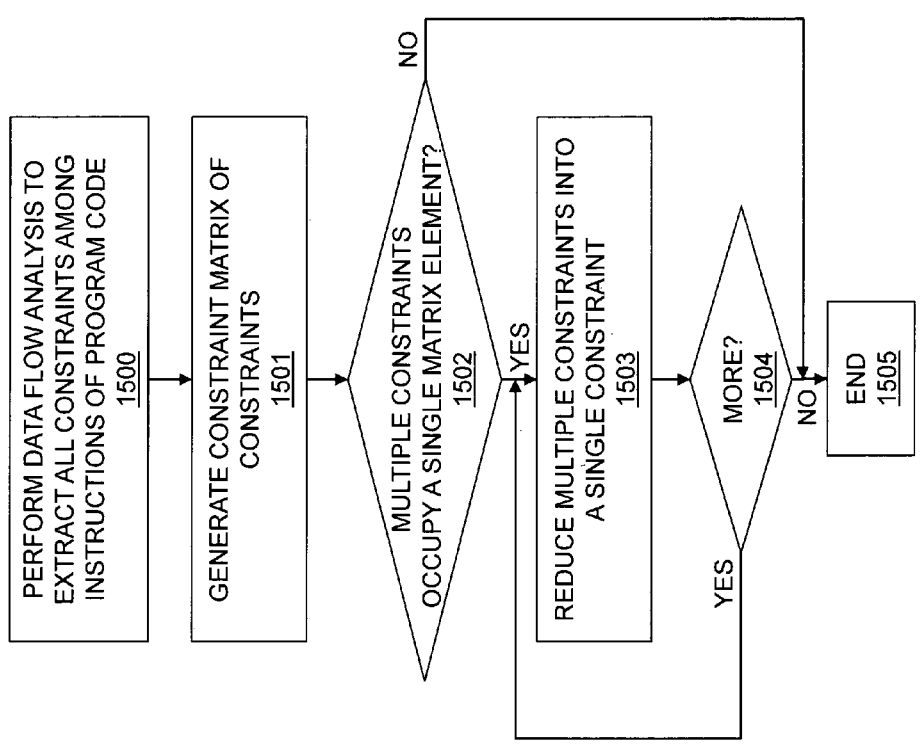
FIG. 15 is a flow chart diagram of a constraint matrix generation procedure according to an exemplary embodiment of the present disclosure.

FIG. 15 is a flow chart diagram of a constraint matrix generation procedure according to an exemplary embodiment of the present disclosure. The procedure can be performed by a constraint matrix generation module (e.g., the constraint matrix generation module 502 of FIG. 5) in extracting constraints from the control flow graph of the source code (e.g., the source code 101 of FIG. 1) and generating the constraint matrix of the constraints in accordance of an exemplary embodiment of the present disclosure. As can be seen from FIG. 15, the procedure starts at block 1500, at which the constraint matrix generation module 502 of FIG. 5 performs data flow analysis to extract all constraints among instructions of the program code to be compiled.

At 1501, the constraint matrix generation module 502 of FIG. 5 generates constraint matrix of the constraints.

At 1502, it is determined whether multiple constraints occupy a single constraint matrix element. If so, the procedure moves to 1503, at which the multiple constraints are reduced to a single constraint.

If at 1502, it is determined that no multiple constraints occupy a single constraint, then procedure ends at 1505.

Figure 16:
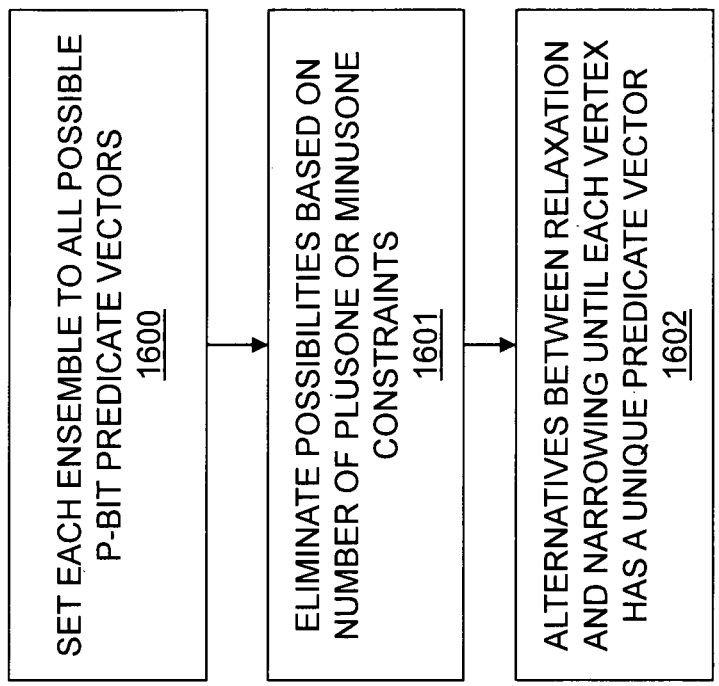
FIG. 16 is a flow chart diagram of a constraint problem solving procedure according to an exemplary embodiment of the present disclosure.

FIG. 16 is a flow chart diagram of a constraint problem solving procedure according to an exemplary embodiment of the present disclosure. The procedure can be performed by a constraint problem solving module (e.g., the constraint problem solving module 503 of FIG. 5) in solving constraints between instructions in accordance of an exemplary embodiment of the present disclosure. The procedure determines and assigns values to the implicit predicate bits that satisfy the constraints specified in the constraint matrix for the control flow graph of the program code (e.g., the source code 101 of FIG. 1). As can be seen from FIG. 16, the procedure starts at block 1600, at which the constraint problem solving module 503 (FIG. 5) sets each ensemble to all possible P-bit predicate vectors. As described above (also in connection with FIG. 5), to each vertex, the solving module 503 maps an ensemble, which is a subset of possible predicate-vector values. The value P is the number of implicit predicate bits to be allocated for control flow. For P-bit vectors, there are $2^P$ possible predicate vectors, so an ensemble can be represented as a $2^P$ bit vector. Setting P to the hardware limit (e.g., eight for the TIA-based processor 106 of FIGS. 1-3) works well because unnecessary predicate bits will be eliminated later by the predicate guard and predicate update generation module 504 of FIG. 5

Next at block 1601, the constraint problem solving module 503 (FIG. 5) eliminates possibilities based on the number of incoming (or outgoing) PlusOne or MinusOne constraints. For example, in the constraint matrix of FIG. 9, if a column v of the matrix has K PlusOne constrains and M MinusOne constraints, then the predicate vector for vertex v must have at least K ones and at least M zeros. All possibilities with fewer ones or zeros can be removed.

At block 1602, the constraint problem solving module 503 (FIG. 5) alternates between relaxation and narrowing. The relaxation phase removes possibilities that violate constraints. If any ensemble becomes empty, then it reports that it could not find a solution. The narrowing phase narrows the search space by choosing a non-singleton ensemble from which to remove a possibility. The constraint problem solving module 503 (FIG. 5) repeats relaxation and narrowing until each vertex has a unique predicate vector.

FIGS. 13-16 are flow charts illustrating procedures or functions according to embodiments of the present disclosure. The techniques illustrated in these figures may be performed sequentially, in parallel or in an order other than what is described. The techniques may be also be performed once or more times. It should be appreciated that not all of the techniques described are required to be performed, that additional techniques may be added, and that some of the illustrated techniques may be substituted with other techniques.

Embodiments of the present disclosure may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., code, program, procedure, process, application, module, unit, logic, block, and so on) as taking an action or causing a result. Such expressions are merely a shorthand way of stating that the execution of the software by a processing system causes the processor to perform an action to produce a result.

The following examples pertain to further embodiments. In one embodiment, a computer-implemented method of compiling a program code into predicated instructions includes extracting, from control flow of the program code, constraints between instructions of the program code. Constraint problem between the instructions is then solved by assigning a predicate vector that satisfies the constraints to each of the instructions. A predicate guard and a predicate update for each of the instructions is then generated based on the predicate vector such that the predicated instructions can be executed on a processor that does not include any program counter.

In a further embodiment, the above-referenced method further includes computing a control flow graph of the program code and extracting the constraints from the control flow graph.

In a further embodiment, the above-referenced method further includes computing constraints on predicate bits set by a programmer of the program code.

In a further embodiment, the extracting further includes generating a matrix of the constraints.

In a further embodiment, the extracting further includes reducing multiple constraints into a single constraint if the multiple constraints occupy a single matrix element in the matrix.

In a further embodiment, each of the predicated instructions corresponds to a hyper-edge of the control flow graph and the generating a predicate guard with the updated predicate value of the above-referenced method is performed by determining solutions for endpoints of each hyper-edge which indicates what predicate guard and the predicate update need to be for a particular instruction.

In a further embodiment, the solving constraint problem between the instructions from the above-referenced method further includes setting each ensemble to all possible predicate bit vectors; eliminating possibilities based on the number of incoming plus-one and minus-one constraints; and alternating between relaxation and narrowing until each vertex has a unique bit vector.

In a further embodiment, the relaxation of the above-referenced method removes possibilities that violate constraints and the narrowing narrows search by choosing a non-singleton ensemble from which to remove a possibility.

In a further embodiment, a non-transitory computer-readable medium include sequences of instructions which, when executed, cause a processor to perform program code compilation of a program code into predicated instructions. The code compilation includes extracting, from control flow of the program code, constraints between instructions of the program code. The constraint problem between the instructions is solved by assigning a predicate vector that satisfies the constraints to each of the instructions. A predicate guard and a predicate update for each of the instructions is then generated based on the predicate vector such that the predicated instructions can be executed on a processor that does not include any program counter.

In a further embodiment, the above-referenced computer-readable medium further includes computing a control flow graph of the program code and extracting the constraints from the control flow graph.

In a further embodiment, the above-referenced computer-readable medium further includes computing constraints on predicate bits set by a programmer of the program code.

In a further embodiment, the extracting, from the control flow graph, constraints between instructions of the program code of the above-referenced computer-readable medium further includes generating a constraint matrix of the constraints.

In a further embodiment, the extracting further includes reducing multiple constraints into a single constraint if the multiple constraints occupy a single matrix element in the matrix.

In a further embodiment, each of the predicated instructions corresponds to a hyper-edge of the control flow graph. The generating a predicate guard and predicate update is performed by determining solutions for endpoints of each hyper-edge which indicates what predicate guard and predicate update need to be for a particular instruction.

In a further embodiment, the solving constraint problem between the instructions of the above-referenced computer-readable medium further includes setting each ensemble to all possible predicate vectors; eliminating possibilities based on the number of incoming plus-one and minus-one constraints; and alternating between relaxation and narrowing until each vertex has a unique predicate vector. The relaxation removes possibilities that violate constraints and the narrowing narrows search by choosing a non-singleton ensemble from which to remove a possibility.

In a further embodiment, a predicated instruction compilation system includes a processor; a memory coupled to the processor; a software compiler stored on the memory and executed by the processor to compile a program code into predicated instructions. The compiler includes a control flow graph generation module to generate a control flow graph of the program code to be compiled into the predicated instructions for execution on an external processor that does not include any program counter. The compiler also includes a control flow transformation module to automatically generate a predicate guard and a predicate update for each of the instructions from the control flow graph such that the predicated instructions can be executed on a processor that does not include any program counter.

In another embodiment, the control flow transformation module further includes a control flow graph receiver to receive the control flow graph of the program code. A constraint matrix generation module is coupled to the control flow graph receiver to extract, from the control flow graph, constraints between instructions of the program code and to arrange the constraints in a matrix. A constraint problem solving module is coupled to the constraint matrix generation module to solve constraint problem between the instructions expressed in the constraint matrix by assigning a predicate vector that satisfies the constraints to each of the instructions. A predicate guard and predicate update generation module is coupled to the constraint problem solving module to generate the predicate guard and predicate update for each of the instructions based on the predicate vector.

In another embodiment, the constraint matrix generation module reduces multiple constraints into a single constraint if the multiple constraints occupy a single matrix element in the matrix.

In yet another embodiment, the constraint problem solving module solves constraint problem between the instructions by setting each ensemble to all possible predicate vectors; eliminating possibilities based on the number of incoming plus-one and minus-one constraints; and alternating between relaxation and narrowing until each vertex has a unique predicate vector. The relaxation removes possibilities that violate constraints and the narrowing narrows search by choosing a non-singleton ensemble from which to remove a possibility.

In a further embodiment, each of the predicated instructions corresponds to a hyper-edge of the control flow graph. The predicate guard and predicate update generation module generates the predicate guard and predicate update by determining solutions for endpoints of each hyper-edge which indicates what predicate guard and predicate update need to be for a particular instruction.

In a further embodiment, an apparatus for compiling program code into predicated instructions includes means for generating, from control flow of the program code, constraints between instructions of the program code; means for solving constraint problem by assigning a predicate vector that satisfies constraints to each of the instructions; and means for generating a predicate guard and a predicate update for each of the instructions based on the predicate vector.

In a further embodiment, the apparatus further includes means for generating a control flow graph of the program code and means for computing the constraints on predicate bits set by a programmer of the program code.

In a further embodiment, the means for extracting further includes means for generating a matrix of the constraints and means for reducing multiple constraints into a single constraint if the multiple constraints occupy a single matrix element in the matrix. In a further embodiment, each of the predicated instructions corresponds to a hyper-edge of the control flow graph. The means for generating the predicate guard and predicate update further includes means for determining solutions for endpoints of each hyper-edge which indicates what predicate guard and predicate update need to be for a particular instruction.

In a further embodiment, the means for solving constraint problem between the instructions further includes means for setting each ensemble to all possible predicate vectors; means for eliminating possibilities based on the number of incoming plus-one and minus-one constraints; and means for alternating between relaxation and narrowing until each vertex has a unique predicate vector. The relaxation removes possibilities that violate constraints and the narrowing narrows search by choosing a non-singleton ensemble from which to remove a possibility While the disclosure has been illustrated and described in detail in the drawings and foregoing description, such an illustration and description are to be regarded as exemplary and not restrictive. It should be understood that only illustrative embodiments of the disclosure have been shown and described and that all changes and modifications consistent with the disclosure and recited claims are intended to be protected.

What is claimed is:

1. A computer-implemented method of compiling a program code into predicated instructions, comprising:
   extracting, from control flow of the program code, constraints between instructions of the program code;
   solving constraint problem between the instructions by determining and assigning a value to a predicate vector that satisfies the constraints to each of the instructions; and
   generating a predicate guard and a predicate update for each of the instructions based on the predicate vector to control sequencing of instruction execution of each of the instructions to turn the instructions into the predicated instructions that can be executed on a processor that does not include any program counter which controls sequencing of instruction execution, wherein the predicate guard and predicate update of an instruction provide sequencing information of the corresponding instruction when the corresponding instruction is executed on the processor that does not include any program counter that controls sequencing of instruction execution, wherein the predicate guard of an instruction controls whether the corresponding instruction should be executed and the predicate update of an instruction updates a predicate register bit of the processor which controls when the corresponding instruction is executed.

2. The method of claim 1, further comprising
   computing a control flow graph of the program code; and
   extracting the constraints from the control flow graph.

3. The method of claim 2, wherein each of the predicated instructions corresponds to a hyper-edge of the control flow graph, wherein the generating the predicate guard and predicate update is performed by determining solutions for endpoints of each hyper-edge which indicates what predicate guard and predicate update need to be for a particular instruction.

4. The method of claim 1, further comprising computing constraints on predicate bits set by a programmer of the program code.

5. The method of claim 1, wherein the extracting further comprises generating a matrix of the constraints.

6. The method of claim 5, further comprising reducing multiple constraints into a single constraint if the multiple constraints occupy a single matrix element in the matrix.

7. The method of claim 1, wherein the solving constraint problem between the instructions further comprises:
   setting each ensemble to all possible predicate vectors;
   eliminating possibilities based on the number of incoming plus-one and minus-one constraints; and
   alternating between relaxation and narrowing until each vertex has a unique bit vector.

8. The method of claim 7, wherein the relaxation removes possibilities that violate constraints and the narrowing narrows search by choosing a non-singleton ensemble from which to remove a possibility.

9. A non-transitory computer-readable medium having sequences of instructions, the sequences of instructions including instructions which, when executed, cause a processor to perform program code compilation of a program code into predicated instructions, comprising:
   extracting, from control flow of the program code, constraints between instructions of the program code;
   solving constraint problem between the instructions of the program code by determining and assigning a value to a predicate vector that satisfies the constraints to each of the instructions of the program code; and
   generating a predicate guard and a predicate update for each of the instructions of the program code based on the predicate vector to control sequencing of instruction execution of each of the instructions of the program code to turn the instructions of the program code into the predicated instructions that can be executed on a processor that does not include any program counter which controls sequencing of instruction execution, wherein the predicate guard and predicate update of an instruction of the program code provide sequencing information of the corresponding instruction when the corresponding instruction is executed on the processor that does not include any program counter that controls sequencing of instruction execution, wherein the predicate guard of an instruction of the program code controls whether the corresponding instruction should be executed and the predicate update of an instruction updates a predicate register bit of the processor which controls when the corresponding instruction is executed.

10. The non-transitory computer-readable medium of claim 9, further comprising
computing a control flow graph of the program code; and
extracting the constraints from the control flow graph.

11. The non-transitory computer-readable medium of claim 9, further comprising computing constraints on predicate bits set by a programmer of the program code.

12. The non-transitory computer-readable medium of claim 9, wherein the extracting further comprises generating a matrix of the constraints.

13. The non-transitory computer-readable medium of claim 12, further comprising reducing multiple constraints into a single constraint if the multiple constraints occupy a single matrix element in the matrix.

14. The non-transitory computer-readable medium of claim 9, wherein each of the predicated instructions corresponds to a hyper-edge of the control flow graph, wherein the generating the predicate guard and predicate update is performed by determining solutions for endpoints of each hyper-edge which indicates what predicate guard and predicate update need to be for a particular instruction.

15. The non-transitory computer-readable medium of claim 9, wherein the solving constraint problem between the instructions further comprises:
setting each ensemble to all possible predicate bit vectors;
eliminating possibilities based on the number of incoming plus-one and minus-one constraints; and
alternating between relaxation and narrowing until each vertex has a unique bit vector, wherein the relaxation removes possibilities that violate constraints and the narrowing narrows search by choosing a non-singleton ensemble from which to remove a possibility.

16. A predicated instruction compilation system, comprising:
a processor;
a memory coupled to the processor;
a software compiler stored on the memory and executed by the processor to compile instructions of a program code into predicated instructions, further comprising
a control flow graph generation module to generate a control flow graph of the program code to be compiled into the predicated instructions for execution on an external processor that does not include any program counter which controls sequencing of instruction execution; and
a control flow transformation module to automatically generate a predicate guard and a predicate update for each of the instruction from the control flow graph such that the predicated instructions can be executed on a processor that does not include any program counter which controls sequencing of instruction execution, wherein the predicate guard and predicate update of an instruction provide sequencing information of the corresponding instruction when the corresponding instruction is executed on the processor that does not include any program counter that controls sequencing of instruction execution, wherein the predicate guard of an instruction controls whether the corresponding instruction should be executed and the predicate update of an instruction updates a predicate register bit of the processor which controls when the corresponding instruction is executed.

17. The system of claim 16, wherein the control flow transformation module further comprises:
a control flow graph receiver to receive the control flow graph of the program code;
a constraint matrix generation module coupled to the control flow graph receiver to extract, from the control flow graph, constraints between instructions of the program code and to arrange the constraints in a matrix;
a constraint problem solving module coupled to the constraint matrix generation module to solve constraint problem between the instructions expressed in the constraint matrix by determining and assigning a value to a predicate vector that satisfies the constraints to each of the instructions; and
a predicate guard and predicate update generation module coupled to the constraint problem solving module to generate the predicate guard and predicate update for each of the instructions based on the predicate vector to control sequencing of instruction execution of each of the instructions.

18. The system of claim 17, wherein the constraint matrix generation module reduces multiple constraints into a single constraint if the multiple constraints occupy a single matrix element of the matrix.

19. The system of claim 17, wherein the constraint problem solving module solves constraint problem between the instructions by
setting each ensemble to all possible predicate bit vectors;
eliminating possibilities based on the number of incoming plus-one and minus-one constraints; and
alternating between relaxation and narrowing until each vertex has a unique bit vector, wherein the relaxation removes possibilities that violate constraints and the narrowing narrows search by choosing a non-singleton ensemble from which to remove a possibility.

20. The system of claim 17, wherein each of the predicated instructions corresponds to a hyper-edge of the control flow graph, wherein the predicate guard and predicate update generation module generates the predicate guard and predicate update by determining solutions for endpoints of each hyper-edge which indicates what predicate guard and predicate update need to be for a particular instruction.

21. An apparatus for compiling program code into predicated instructions, comprising:
means for generating, from control flow of the program code, constraints between instructions of the program code;
means for solving constraint problem by determining and assigning a value to a predicate vector that satisfies the constraints to each of the instructions; and
means for generating a predicate guard and a predicate update for each of the instructions based on the predicate vector to control sequencing of instruction execution of each of the instructions, wherein the predicated instructions can be executed on a processor that does not include any program counter which controls sequencing of instruction execution, wherein the predicate guard and predicate update of an instruction provide sequencing information of the corresponding instruction when the corresponding instruction is executed on the processor that does not include any program counter that controls sequencing of instruction execution, wherein the predicate guard of an instruction controls whether the corresponding instruction should be executed and the predicate update of an instruction updates a predicate register bit of the processor which controls when the corresponding instruction is executed.

22. The apparatus of claim 21, further comprising
means for generating a control flow graph of the program code;
means for computing the constraints on the predicate value set by a programmer of the program code.

23. The apparatus of claim 22, wherein the means for computing further comprises
means for generating a matrix of the constraints; and
means for reducing multiple constraints into a single constraint if the multiple constraints occupy a single matrix element of the constraint matrix.

24. The apparatus of claim 21, wherein each of the predicated instructions corresponds to a hyper-edge of the control flow graph, wherein the means for generating the predicate guard and predicate update further comprises means for determining solutions for endpoints of each hyper-edge which indicates what predicate guard and predicate update need to be for a particular instruction.

25. The apparatus of claim 21, wherein the means for solving constraint problem between the instructions further comprises:
means for setting each ensemble to all possible predicate bit vectors;
means for eliminating possibilities based on the number of incoming plus-one and minus-one constraints; and
means for alternating between relaxation and narrowing until each vertex has a unique bit vector, wherein the relaxation removes possibilities that violate constraints and the narrowing narrows search by choosing a non-singleton ensemble from which to remove a possibility.

* * * * *